United States Patent [19]

Suzuki et al.

[11] 3,833,476

[45] Sept. 3, 1974

[54] PROCESS FOR PREPARING CHLORAMPHENICOL ANALOGUES

[75] Inventors: Takeo Suzuki; Fusao Tomita; Haruo Honda; Kunikatsu Shirahata; Takashi Deguchi, all of Tokyo; Fumio Kato, Shizuoka, all of Japan

[73] Assignee: Kyowa Hakko Kogyo Kabushiki Kaisha, Tokyo-to, Japan

[22] Filed: May 21, 1973

[21] Appl. No.: 362,625

Related U.S. Application Data

[63] Continuation-in-part of Ser. No. 137,696, April 26, 1971, abandoned.

[52] U.S. Cl. .............................. 195/96, 195/80 R
[51] Int. Cl. ............................................. C12d 13/00
[58] Field of Search ..................... 195/80, 81, 82, 96

[56] References Cited
UNITED STATES PATENTS

| | | | |
|---|---|---|---|
| 2,483,892 | 10/1949 | Ehrlich et al. | 195/80 R |
| 3,751,339 | 7/1973 | Suzuki et al. | 195/96 |

*Primary Examiner*—Lionel M. Shapiro
*Assistant Examiner*—Robert J. Warden
*Attorney, Agent, or Firm*—Wolder & Gross

[57] ABSTRACT

The present invention relates to a process for preparing analogues of chloramphenicol, characterized by culturing a microorganism capable of producing D-threo-2-acetamido-1-p-nitrophenyl-1,3-propanediol (hereinafter designated as Substance C), and the derivatives of D-threo-2-propionamido-1-p-nitrophenyl-1,3-propanediol (hereinafter designated as Substance A), D-threo-2-isobutyramido-1-p-nitrophenyl-1,3-propanediol (hereinafter designated as Substance B) and Substance C of which 3-hydroxy group is substituted by O-acetyl group, under aerobic conditions in a culture medium containing assimilable carbon sources to form and accumulate said analogues of chloramphenicol therein and isolating and recovering the same therefrom, said microorganism belongs to the genera *Corynebacterium*.

These substances A, B and C are the derivatives of D-threo-2-amino-1-p-nitrophenyl-1,3-propanediol of which 2-amino group is substituted by propionamide, isobutyramide and acetamide respectively.

7 Claims, No Drawings

PROCESS FOR PREPARING CHLORAMPHENICOL ANALOGUES

RELATED APPLICATION

The present application is a continuation-in-part of Ser. No. 137,696 now abandoned, filed Apr. 26, 1971 in the name of the present inventors.

The process of the present invention is directed to the preparation of chloramphenicol-related compounds by fermentation using inexpensive hydrocarbons or carbohydrates as raw materials. Such compounds have known utility as antibacterial medicine. Conventionally, analogues of chloramphenicol have been derived chemically from chloramphenicol obtained by the fermentation of a microorganism belonging to Actinomycetes or by chemical synthesis. A process for preparing analogues of chloramphenicol directly by fermentation using bacteria has never been reported in the art.

It has now been discovered that the above-mentioned types of chloramphenicol analogues can be prepared with a good yield by means of culturing a microorganism belonging to the genus Corynebacterium, and capable of growing in a culture medium containing hydrocarbons, specifically n-paraffins as carbon sources.

When compared with the preparation of chloramphenicol by fermentation using a microorganism belonging to Actinomycetes, the preparation of the analogues of chloramphenicol in accordance with the present invention has the following advantages:

a. shorter period of culturing time,
b. larger yields of the products, and
c. wider variety of suitable carbon sources (not only carbohydrates but also cheaper hydrocarbons such as n-paraffins, alcohols, organic acids etc.)

Various microorganisms which are classified into the genus Corynebacterium and other microorganisms closely related thereto may be used for the practice of the present invention. However, it is preferred to use, for example Corynebacterium hydrocarboclastus ATCC 15592 and Corynebacterium hydrocarboclastus ATCC 21628.

The above microorganism is freely available to the public and is on deposit with the American Type Culture Collection.

It is preferred to use as carbon sources various hydrocarbon fractions containing n-paraffins, especially $C_{10}$ to $C_{22}$, preferably $C_{12}$ to $C_{18}$ n-paraffins. But it is also possible to use other carbon sources such as carbohydrates, organic acids, alcohols, etc. (e.g. glucose, sorbitol, sucrose, glycerol, acetic acid etc.) as far as they are assimilable by the microorganisms employed.

Various inorganic and organic nitrogen sources can be used as nitrogen sources for the present invention.

In carrying out the cultivation, hydrocarbons or carbohydrates are used as main carbon sources. They are supplemented, for example, with organic nitrogen sources such as corn steep liquor, yeast extract etc., inorganic metallic salts such as iron, manganese, magnesium, potassium, sodium etc. and growth-promoting factors to provide a culture medium. The medium is sterilized and inoculated with the microorganism. The cultivation is carried out under aerobic conditions at 20°–45°C. During the cultivation, the pH is adjusted to 4–10, preferably 6–8, for example, by addition of urea solution, aqueous ammonia, ammonia or ammonium carbonate solution. The cultivation is completed after 2–7 days. The completion of the fermentation can be confirmed by the values of the chloramphenicol analogues obtained as determined by means of the paper disc method so as to reach a maximum.

The following non-limitative examples illustrate the present invention.

EXAMPLE 1

Corynebacterium hydrocarboclastus KY4339 (ATCC 21628) was cultured with shaking for 24 hours in a medium having a composition of 1.0 percent of meat extract, 1.0 percent of peptone, 0.5 percent of NaCl and 2 percent of sorbitol, and having a pH of 7.2 (before sterilization). The resultant seed culture was inoculated into 3.0 liters of a culture medium having the following composition in a 5-liter jar fermenter at a ratio of 10 percent by volume of seed to culture medium.

| | | | |
|---|---|---|---|
| $KH_2PO_4$ | 0.2% | $Na_2HPO_4$ | 0.2% |
| $MgSO_4·7H_2O$ | 0.1% | $MnSO_4·4H_2O$ | 0.002% |
| $FeSO_4·7H_2O$ | 0.02% | $ZnSO_4·7H_2O$ | 0.001% |
| $(NH_4)_2SO_4$ | 0.5% | $CuCl_2·2H_2O$ | 0.0003% |
| Corn steep liquor | 0.5% | Yeast extract | 0.5% |
| n-paraffin | 10% (v/v) | (mixture of $C_{12}$ – $C_{18}$) | |

The cultivation was carried out at 30°C for 65 hours with agitation (650 r.p.m.) and aeration (1 liter/min) with sterilized air. The pH of the medium was automatically adjusted to 6.5 – 6.8 with aqueous ammonia. Each 100 ml of n-paraffin was supplemented to the medium three times after every 12 hours. The n-paraffin substrate was almost consumed after the completion of the fermentation.

The fermented liquor obtained (2 liters) by the removal of microbial cells from the broth was adjusted to a pH of 4.0. After addition of an equal amount of ethyl acetate, the fermented liquor was shaken for 24 hours to extract analogues of chloramphenicol in the ethyl acetate layer. The thus-extracted liquor (2.3 liters) was dehydrated with anhydrous sodium sulphate and evaporated at 35°C under reduced pressure. The resultant residue was further extracted with ethyl acetate (100 ml). After centrifugation, the solvent layer was fed through a silica gel column (diameter: 4 cm; height: 20 cm) which was then washed thoroughly with chloroform. After this, a mixed solution of chloroform and methanol (95:5) was fed through the column.

In the course of the elution Substance B was eluted into the fraction of from 200 ml to 500 ml. Substances A and C were respectively eluted into the fractions of from 600 ml to 1,000 ml and 1,200 to 1,700 ml. Each fraction was then separately collected and concentrated. Each concentrated fraction was dissolved in ethanol, and Substances A, B and C were then separately crystallized by distillation. In this manner, 4.2 g of Substance B, 2.4 g of Substance A and 3.4 g of Substance C were isolated.

The isolated crystals were respectively purified by repeating the recrystallization from ethylene dichloride.

The isolated crystals of Substances A, B and C had lower antibiotic activities in vitro than that of the chloramphenicol, but had the same tendencies as to antibiotic spectrum. These substances had a maximum ultraviolet absorption at 273μ which was the same as that of chloramphenicol.

From the results obtained by elemental analysis, infrared spectrum, nuclear magnetic resonance spectrum, mass spectrometry, etc., it was found that Substances A, B and C are respectively identical with the substances having the following structures, which have already been derived chemically from chloramphenicol.

D-threo-2-propionamido-1-p-nitrophenyl-1,3-propanediol (Substance A)

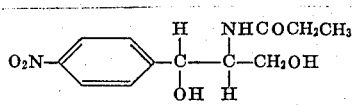

D-threo-2-isobutyramido-1-p-nitrophenyl-1,3-propanediol (Substance B)

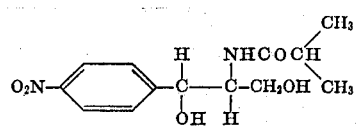

D-threo-2-acetamido-1-p-nitrophenyl-1,3-propanediol (Substance C)

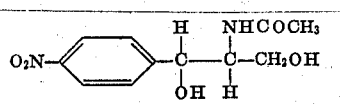

EXAMPLE 2

The same strain as that used in Example 1 was cultured in a similar manner to that described in Example 1 with the exception of that n-paraffin, namely, fraction of $C_{12}$ to $C_{15}$, was substituted by sucrose. After culturing for 70 hours, the fermented liquor obtained was treated in a similar manner to that described in Example 1. In this case, the concentrate obtained by extraction with ethyl acetate was fed through a silica gel column which was eluted with chloroform and a chloroform-methanol mixture. It was found that an unknown substance was eluted in the chloroform eluate. Further, Substances A, B and C were eluted in the eluate of a mixture of chloroform and methanol and were isolated as crystals in amounts of 4.2 g, 1.2 g and 3.4 g, respectively. The above-mentioned unknown substance (1.4g) eluted in chloroform eluate was crystallized after evaporation of chloroform, and this substance was determined as a mixture of acetyl derivatives of Substances A, B and C by means of infra-red spectrum, nuclear magnetic resonance, elementary analysis, etc. Concurrently, it was confirmed that Substances A, B and C were produced by deacylating these acetyl derivatives.

EXAMPLE 3

The same strain as that used in Example 1 was cultured for 70 hours using various carbon sources in a similar manner to that described in Example 1. The results obtained are shown in the following table. The amounts of products formed are in grams per liter.

TABLE

| | Conc. | Sub.B g/l | Sub.A g/l | Sub.C g/l | D g/l |
|---|---|---|---|---|---|
| n-paraffin ($C_{10}$ to $C_{20}$) | 10% | 2.5 | 4.8 | 2.1 | 1.2 |
| sucrose | 10% | 1.5 | 4.2 | 2.2 | 1.3 |
| glucose | do. | 0.7 | 2.3 | 1.0 | 0.5 |
| sorbitol | do. | 0.9 | 1.5 | 0.8 | 0.4 |
| ethanol | 2% at a time (total: 10%) | 0.6 | 1.2 | 0.6 | 0.2 |
| glycerol | 10% | 1.3 | 2.3 | 0.8 | 0.8 |
| waste molasses | do. | 1.2 | 4.2 | 2.8 | 1.2 |
| acetic acid | 1% at a time (total: 10%) | 0.7 | 0.8 | 0.5 | 0.4 |

Remarks:
Conc. — Concentration of additives, vol %
D — mixture of acetyl derivates of Substances A, B and C Having described the present invention, that which is sought to be protected is set forth in the following claims.

We claim:

1. A process for preparing D-threo-2-acetamido-1-p-nitrophenyl-1,3-propanediol and the derivatives of D-threo-2-propionamido-1-p-nitrophenyl-1,3-propanediol, D-threo-2-isobutyramido-1-p-nitrophenyl-1,3-propanediol and said D-threo-2-acetamido-1-p-nitrophenyl-1,3-propanediol of which 3-hydroxy group is substituted by O-acetyl group by culturing a microorganism belonging to the genera *Corynebacterium* in a culture medium containing assimilable carbon sources under aerobic conditions so as to produce one of the above noted compounds in said medium, and recovering the same therefrom.

2. The process of claim 1 wherein said culturing occurs at 20°C to 45°C at a pH of 4 to 10.

3. The process of claim 1 wherein said carbon source is a $C_{10}$ to $C_{20}$ n-paraffin.

4. The process of claim 1 wherein said carbon source is a material containing sucrose or glucose as sugar source.

5. The process of claim 1 wherein 3-O-acetyl derivatives of D-threo-2-propionamido-1-p-nitrophenyl-1,3-propanediol, D-threo-2-isobutyramido-1-p-nitrophenyl-1,3-propanediol and D-threo-2-acetamido-1-p-nitrophenyl-1,3-propanediol are produced.

6. The process of claim 1 wherein the genera *Corynebacterium* is *Corynebacterium hydrocarboclastus* ATCC 15592.

7. The process of claim 1 wherein the genera *Corynebacterium* is *Corynebacterium hydrocarboclastus* ATCC 20016.

* * * * *

UNITED STATES PATENT OFFICE
CERTIFICATE OF CORRECTION

PATENT NO. : 3,833,476
DATED : September 3, 1974
INVENTOR(S) : Takeo Suzuki et al It is certified that error appears in the above-identified patent and that said Letters Patent are hereby corrected as shown below:

Claim 7 should read as follows:

--7. The process of claim 1 wherein the genera Corynebacterium is Corynebacterium hydrocarboclastus ATCC 21628.--

Signed and Sealed this

Fourth Day of January 1977

[SEAL]

Attest:

RUTH C. MASON
*Attesting Officer*

C. MARSHALL DANN
*Commissioner of Patents and Trademarks*